US011382103B2

(12) United States Patent
Jeunen et al.

(10) Patent No.: US 11,382,103 B2
(45) Date of Patent: Jul. 5, 2022

(54) METHOD FOR ALLOCATING FREQUENCY CHANNELS TO A PLURALITY OF NEIGHBORING ACCESS POINTS

(71) Applicant: AIRTIES BELGIUM SPRL, Woluwe-Saint-Lambert (BE)

(72) Inventors: Olivier Jeunen, Hoevenen (BE); Patrick Bosch, Antwerp (BE); Ensar Zeljkovic, Antwerp (BE); Karel Van Doorselaer, Edegem (BE); Nick Godman, Kontich (BE)

(73) Assignee: AIRTIES BELGIUM SPRL, Woluwe-Saint-Lambert (BE)

( * ) Notice: Subject to any disclaimer, the term of this patent is extended or adjusted under 35 U.S.C. 154(b) by 0 days.

(21) Appl. No.: 16/928,791

(22) Filed: Jul. 14, 2020

(65) Prior Publication Data

US 2020/0413404 A1 Dec. 31, 2020

Related U.S. Application Data

(63) Continuation of application No. 16/004,416, filed on Jun. 10, 2018, now Pat. No. 10,716,112.

(30) Foreign Application Priority Data

Jun. 14, 2017 (EP) .................................... 17305724

(51) Int. Cl.
*H04W 72/04* (2009.01)
*H04W 16/10* (2009.01)
*H04L 5/00* (2006.01)

(52) U.S. Cl.
CPC ....... *H04W 72/0453* (2013.01); *H04L 5/0037* (2013.01); *H04W 16/10* (2013.01);
(Continued)

(58) Field of Classification Search
CPC ............... H04W 72/04; H04W 72/082; H04W 72/0453; H04W 16/00; H04W 16/14;
(Continued)

(56) References Cited

U.S. PATENT DOCUMENTS

| 6,636,737 B1 | 10/2003 | Hills et al. |
| 2005/0003827 A1 | 1/2005 | Whelan |

(Continued)

FOREIGN PATENT DOCUMENTS

| WO | 2001/080500 | 10/2001 |
| WO | 2016/150818 | 9/2016 |

OTHER PUBLICATIONS

Adams et al., "Linearization strategies for a class of zero-{}ne mixed integer programming problems," Operations Research, vol. 38, No. 2, pp. 217-226 (Apr. 11, 1990).

(Continued)

*Primary Examiner* — Peter Chen
(74) *Attorney, Agent, or Firm* — Volpe Koenig (57) ABSTRACT

In environments such as buildings in which access points are densely deployed, those access points influence each other. To provide a frequency channel allocation scheme in such densely populated environments information gathered by the access points are collected. In such a situation, relying on a list of neighboring access points, background noise, communication medium business, the beacon messages received from access points as well as their associated RSSI, may lead to a frequency channel allocation scheme that may not significantly reduce the interference between access points. The invention introduces an activity-based distance computed between at least two access points which represents a time overlap in a use of the communication medium.

14 Claims, 3 Drawing Sheets

(52) U.S. Cl.
CPC .......... *H04L 5/0058* (2013.01); *H04L 5/0067* (2013.01); *H04L 5/0069* (2013.01); *H04L 5/0078* (2013.01)

(58) Field of Classification Search
CPC ... H04W 84/12; H04W 88/08; H04W 52/243; H04W 52/244; H04W 52/245; H04W 92/20; H04L 5/0005; H04L 5/0037; H04L 5/0058; H04L 5/0067; H04L 5/0069; H04L 5/0073; H04L 5/0078
See application file for complete search history.

(56) References Cited

U.S. PATENT DOCUMENTS

| | | | |
|---|---|---|---|
| 2006/0072602 A1 | 4/2006 | Achanta | |
| 2006/0217067 A1* | 9/2006 | Helbig | H04W 16/14 455/63.1 |
| 2013/0230035 A1 | 9/2013 | Grandhi et al. | |
| 2013/0272285 A1* | 10/2013 | Goldsmith | H04W 24/02 370/338 |
| 2015/0327282 A1* | 11/2015 | Werner | H04W 72/085 455/450 |
| 2018/0295528 A1* | 10/2018 | Anantha | H04W 24/08 |
| 2019/0121951 A1 | 4/2019 | Nassi et al. | |

OTHER PUBLICATIONS

Bellman, R., "Dynamic Programming and Lagrange Multipliers", Proceedings of the National Academy of Sciences, vol. 42, No. 10, pp. 767-769 (May 21, 1956).
Chen et al., "Improved Measurement-Based Frequency Allocation Algorithms for Wireless Networks", IEEE Global Telecommunications Conference (GLOBECOM '07), Washington, D.C., USA, pp. 4790-4795 (Nov. 26, 2007).
Chieochan et al., "Channel Assignment Schemes for Infrastructure-Based 802.11 WLANs: A survey," IEEE Communications Surveys & Tutorials, vol. 12, No. 1, pp. 124-136 (Feb. 17, 2010).
Doering et al., "About the practicality of using partially overlapping channels in IEEE 802.11 b/g networks," 2013 IEEE International Conference on Communications (ICC), pp. 5110-5114 (Jun. 9-13, 2013).
Erdos et al., "On random graphs 1," Publ. Math. Debrecen, vol. 6, pp. 290-297 (Nov. 19, 1958).
Fan et al., "Cross-Layer Interference Minimization-Oriented Channel Assignment in IEEE 802.11 WLANs," 2011 IEEE 22nd International Symposium on Personal Indoor and Mobile Radio Communications (PIMRC), Toronto, Canada, pp. 1083-1087 (Sep. 2011).
Freeman, "A set of measures of centrality based on betweenness"—Sociometry, vol. 40, No. 1, pp. 35-41, American Sociological Association (Mar. 1977).
IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2016 (Dec. 7, 2016).
Karp, "Reducibility among combinatorial problems," Complexity of computer computations. Springer, pp. 85-103 (Jan. 1972).
Liu et al.—"Channel assignment exploiting partially overlapping channels for wireless mesh networks," Global Telecommunications Conference, 2009 (Nov. 30-Dec. 4, 2009).
Luenberger, "Introduction to linear and nonlinear programming," Addison-Wesley Reading, MA, vol. 28. (Jan. 1973).
Mahonen et al., "Automatic Channel Allocation for Small Wireless Local Area Networks Using Graph Colouring Algorithm Approach", 15th IEEE International Symposium on Personal, Indoor and Mobile Radio Communications (PIMRC), Barcelona, Spain, pp. 536-539 (Sep. 5, 2004).
Mishra et al., "A Client-driven Approach for Channel Management in Wireless LANs", 25th IEEE International Conference on Computer Communications (INFOCOM 2006), Barcelona, Spain, pp. 1-12 (Apr. 23, 2006).
Mishra et al., "Distributed Channel Management in Uncoordinated Wireless Environments", 12th Annual International Conference on Mobile Computing and Networking MOBICOM'06, Los Angeles, California, USA, pp. 1-12 (Sep. 23, 2006).
Nemhauser et al., "Constraint Classification for Mixed Integer Programming Formulations," IEEE Transactions on Software Engineering (1991).
Raghavan et al., "Near linear time algorithm to detect community structures in large-scale networks" Physical Review E, vol. 76, No. 3, p. 036106—American Physical Society (Nov. 9, 2007).
Ryan et al., "The problem of exclusive arrangements in multiple dwelling units: Unlocking broadband growth in Indonesia and the global South," The 7th Indonesia International Conference on Innovation, Entrepreneurship, and Small Business (Jul. 29, 2015). International Journal of Business, vol. 21, No. 3 (Jul. 2016).
Sakoe et al., "Dynamic programming algorithm optimization for spoken word recognition," IEEE Transactions on Acoustics, Speech, and Signal Processing, vol. 26, Issue 1, pp. 43-49 (Feb. 1978).
Tibshirani, "Regression shrinkage and selection via the lasso," Journal of the Royal Statistical Society, Series B (Methodological), vol. 58, No. 1, pp. 267-288 (Jan. 1996).
Tong et al., "Weighted label propagation algorithm for overlapping community detection," 2015 IEEE International Conference on Communications (ICC), pp. 1238-1243 (Jun. 8-12, 2015).
Villegas et al., "Effect of adjacent-channel interference in IEEE 802.11 WLANs," 2nd International Conference on Cognitive Radio Oriented Wireless Networks and Communications (Aug. 2007).
Villegas et al., "Frequency assignments in IEEE 802.11 WLANs with efficient spectrum sharing," Wireless Communications and Mobile Computing, vol. 9, No. 8, pp. 1125-1140 (Aug. 2009).
Wang et al., "Primary User Activity Based Channel Allocation in Cognitive Radio Networks", 2010 IEEE $72^{nd}$ Vehicular Technology Conference (VTC 2010), Ottawa, Canada, pp. 1-5 (Sep. 2010).
Xhou et al., "Channel assignment for WLAN by considering overlapping channels in SINR interference model," 2012 IEEE International Conference on Computing, Networking and Communications (ICNC), pp. 1005-1009 (Jan. 30-Feb. 2, 2012).

* cited by examiner

METHOD FOR ALLOCATING FREQUENCY CHANNELS TO A PLURALITY OF NEIGHBORING ACCESS POINTS

REFERENCE

This application is a continuation of U.S. patent application Ser. No. 16/004,416 which was filed on Jun. 10, 2018, now issued as U.S. Pat. No. 10,716,112, which claims priority from European Patent Application No. 17305724.1, which was filed on Jun. 14, 2017, the contents of which are hereby incorporated by reference herein.

TECHNICAL FIELD

The present invention relates to wireless local networks and more particularly to the allocation of frequency channels between a plurality of neighboring access points.

BACKGROUND

Gateways are widely used to connect devices at the home to the Internet or any other wide area network (WAN). Gateways use in particular Digital Subscriber Line (DSL) technology that enables a high data rate transmission over copper lines or optical lines. Residential gateways, but also other devices such as routers, switches, telephones and set-top boxes, are understood in this context as Customer Premises Equipment (CPE) devices.

Gateways including wireless technology have a key role in today's home and professional environments. A mechanism for connecting wireless devices to a Local Area Network (LAN) is called Wi-Fi, which is a brand name of the Wi-Fi Alliance for devices using the IEEE 802.11 family of standards for wireless data transmission. The IEEE 802.11 standards define two types of wireless nodes, a general wireless device that can connect to other devices called a station and a special type of station that is in control of the network, namely an access point. A Wi-Fi network, often called a WLAN (Wireless Local Area Network), consists of one or more access points embedded in a gateway connected to one or several stations. Of course, gateways may use other mechanisms for connecting wireless devices to a Local Area Network (LAN).

Due to its flexible and "invisible" nature, a lot of local area network devices are utilizing Wi-Fi rather than the classical wired Ethernet approach. This widespread usage of wireless local area network has exposed however a serious downside of using a shared medium technology: interference. Interference, both Wi-Fi and non-Wi-Fi related, leads to a degraded user experience due to the nature of IEEE 802.11.

An important aspect when configuring a wireless local area network, is the allocation of a frequency channel to a given access point. Auto Channel Selection (ACS) algorithm allows the access points to scan the various frequency channels available and select a frequency channel based on several parameters such as background noise, communication medium business, the number of neighboring access points based on beacon messages received from other access points as well as the Received Signal Strength Indication (RSSI) with which these beacon messages are received, etc.

In environments such as buildings in which access points are densely deployed, those access points influence each other, in particular, by causing interference to one another. In order to provide a frequency channel allocation scheme in such densely populated environments information gathered by the access points are collected in a centralized manner so as to coordinate the frequency channel allocation between the different access points. That information is for example, for a given access point, a list of neighboring access points, the frequency channel allocated to those neighboring access points as well as the respective RSSI, etc.

In case an access point has less neighboring access points than the number of available frequency channels, a straightforward solution consists in allocating non-overlapping frequency channels to each of the neighboring access points. Such a solution cannot be implemented in densely populated environments where an access point has more neighboring access points than the number of available frequency channels.

In such a situation, relying on a list of neighboring access points, background noise, communication medium business, the beacon messages received from neighboring access points as well as the Received Signal Strength Indication (RSSI) with which these beacon messages are received, etc. may lead to a frequency channel allocation scheme that may not significantly reduce the interference between access points because the correlation between interference and the above-mentioned parameters is not well known and/or deterministic.

The present invention has been devised with the foregoing in mind.

SUMMARY OF INVENTION

According to a first aspect of the invention there is provided a computer implemented method for allocating frequency channels among a set of neighboring access points, said method comprising:
  computing an activity-based distance representing a time overlap in a use of a communication medium by at least two access points from said set of neighboring access points, said activity-based distance being inversely proportional to a duration of said time overlap,
  allocating frequency channels to access points from said set of neighboring access points minimizing a sum of the time overlaps in the use of said allocated frequency channel.

The method according to an embodiment of the invention introduces a new metric for allocating frequency channels between a plurality of neighboring access points. This new metric is an activity-based distance computed between at least two neighboring access points. The activity-based distance represents a time overlap in a use of the communication medium, i.e. a frequency channel, by at least two neighboring access points.

This new metric offers a realistic representation of the influence neighboring access points have on each other. Indeed, an access point can only cause interference to another neighboring access point when both access points are using the communication medium at the same time, i.e. when there is a time overlap in the use the communication medium by these two access nodes.

Allocating a same frequency channel to neighboring access nodes with the largest activity-based distance, i.e. with a minimal time overlap in the use of the communication medium, makes sense since these access nodes would be less likely to interfere with each other than access points with a smaller distance.

Furthermore, the use of this new metric differs from the current approach in the field of frequency allocation channel in a wireless local area network, which rely on the value of the RSSI of the neighboring access nodes. Nowadays, it is deemed wiser not allocate the same frequency channel to an access point and one of its neighboring access point detected with a strong RSSI. However, experiments may show that the RSSI value associated to an access node has little to no impact on the interference this access node generates on other neighboring access nodes.

According to an embodiment of the invention, computing the activity-based distance comprises:
    computing a similarity between at least two temporal sequences representing the use of the communication medium by said at least two access points.

The use of the communication medium is monitored for the access points belonging to the set of neighboring access points, for example during a week, and is discretized in order to compute the similarity between all the uses.

According to an embodiment of the invention, the similarity between the at least two temporal sequences representing the use of the communication medium by said at least two access points is computed using a dynamic time warping algorithm.

Dynamic time warping algorithm is well known for measuring similarity between two temporal sequences which may vary in speed. It is used to compute the activity-based distance between the temporal sequences representing the use of the communication medium by said at least two access points.

According to an embodiment of the invention, allocating frequency channels to access points from said set of neighboring access points minimizing a sum of the time overlaps in the use of said allocated frequency channel comprises:
    minimizing the function $$F(D, C) = \sum_{k \in K} \sum_{i \in V} \sum_{j \in V} \frac{1}{1 + D_{ij}} C_{ik} C_{jk},$$

where $D_{ij}$ is an activity-based distance matrix, $C_{ik}$, $C_{jk}$ is a frequency channel allocation matrix, K is a set of frequency channels to allocate, V is the set of access points, k is a frequency channel, and i and j are access points.

According to an embodiment of the invention, $\Sigma_{k \in K} C_{ik} = 1$, $\forall\ i \in V$.

This constraint is introduced to ensure that every access point in the set of neighboring access point gets allocated one frequency channel.

According to an embodiment of the invention, the method comprises, prior to computing said activity-based distance:
    identifying access points belonging to a same set of access points based on beacon messages received from neighboring access points.

In densely populated environments, separating access points in different set of neighboring access points enables to reduce computations. An access point receives the beacon messages emitted by other access points when they are within range. Thus, neighboring access points are access points from which beacon messages are received.

According to an embodiment of the invention, the method further comprises:
    obtaining a frequency allocation scheme for a plurality of sets of neighboring access points based on the frequency channel allocations of said sets of access points.

Another object of the invention is a device capable of allocating frequency channels among a set of neighboring access points, said communication device comprising at least a hardware processor configured to:
    compute an activity-based distance representing a time overlap in a use of a communication medium by at least two access points from said set of neighboring access points, said activity-based distance being inversely proportional to a duration of said time overlap,
    allocate frequency channels to access points from said set of neighboring access points minimizing a sum of the time overlaps in the use of said allocated frequency channel.

According to an embodiment of the invention, computing the activity-based distance comprises:
    computing a similarity between at least two temporal sequences representing the use of the communication medium by said at least two access points.

According to an embodiment of the invention, the similarity between the at least two temporal sequences representing the use of the communication medium by said at least two access points is computed using a dynamic time wrapping algorithm.

According to an embodiment of the invention, allocating frequency channels to access points from said set of neighboring access points minimizing a sum of the time overlaps in the use of said allocated frequency channel comprises:
    minimizing the function $$F(D, C) = \sum_{k \in K} \sum_{i \in V} \sum_{j \in V} \frac{1}{1 + D_{ij}} C_{ik} C_{jk},$$

where $D_{ij}$ is an activity-based distance matrix, $C_{ik}$, $C_{jk}$ is a frequency channel allocation matrix, K is a set of frequency channels to allocate, V is the set of access points, k is a frequency channel, and i and j are access points.

According to an embodiment of the invention, $\Sigma_{k \in K} C_{ik} = 1$, $\forall\ i \in V$.

According to an embodiment of the invention, the hardware processor, prior to computing said activity-based distance:
    identifies access points belonging to a same set of access points based on beacon messages received from neighboring access points.

Some processes implemented by elements of the invention may be computer implemented. Accordingly, such elements may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, such elements may take the form of a computer program product embodied in any tangible medium of expression having computer usable program code embodied in the medium.

Since elements of the present invention can be implemented in software, the present invention can be embodied as computer readable code for provision to a programmable apparatus on any suitable carrier medium. A tangible carrier medium may comprise a storage medium such as a floppy disk, a CD-ROM, a hard disk drive, a magnetic tape device or a solid-state memory device and the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE DRAWINGS

Embodiments of the invention will now be described, by way of example only, and with reference to the following drawings in which.

DETAILED DESCRIPTION

Figure 1:
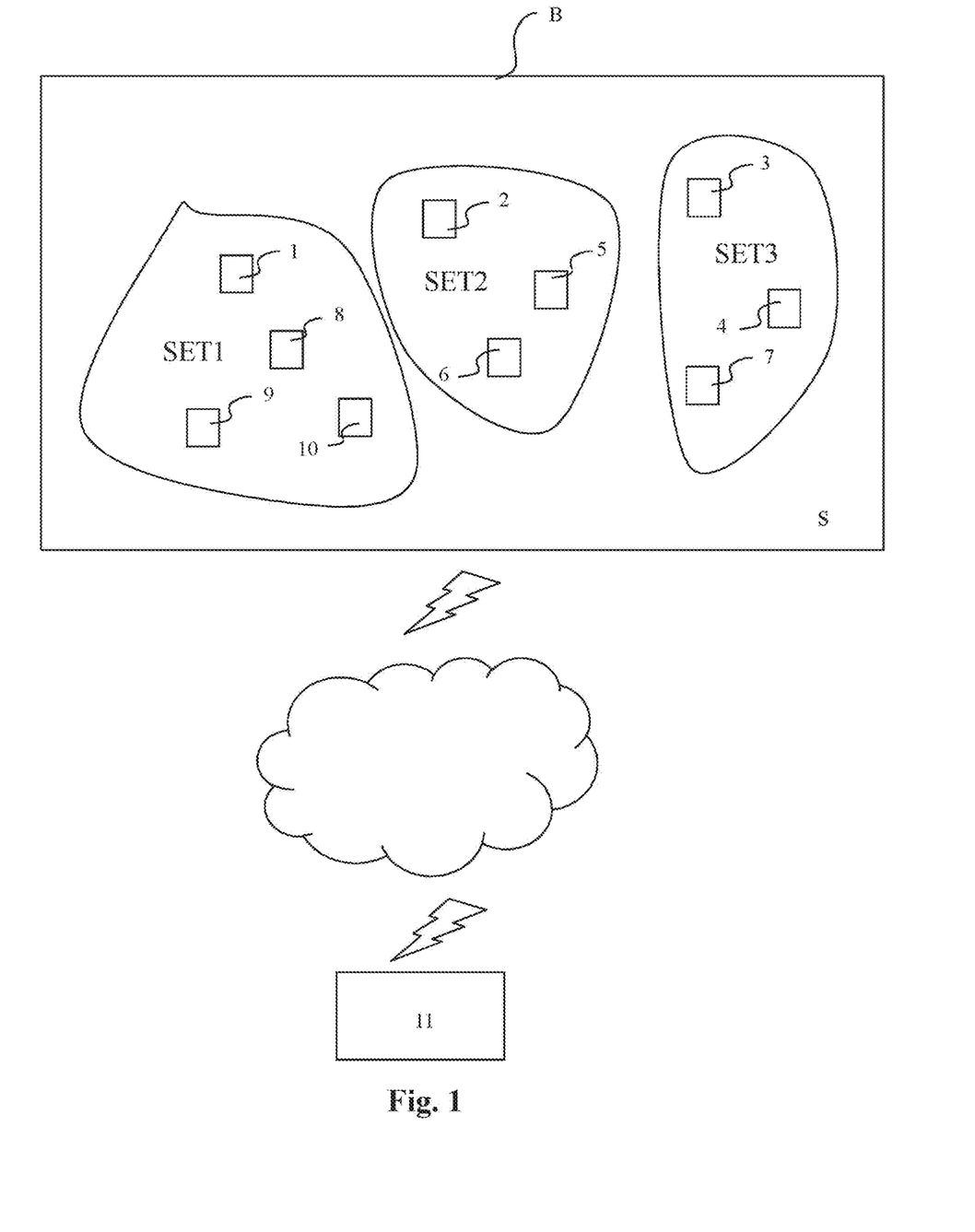
FIG. 1 represents a system comprising a plurality of wireless access points located for example in a same budding.

The elements shown in FIG. 1 may be implemented in various forms of hardware, software or combinations thereof. Preferably, these elements are implemented in a combination of hardware and software on one or more appropriately programmed general-purpose devices, which may include a processor, memory and input/output interfaces. Herein, the phrase "coupled" is defined to mean directly connected to or indirectly connected with through one or more intermediate components. Such intermediate components may include both hardware and software-based components.

The present description illustrates the principles of the present disclosure. It will thus be appreciated that those skilled in the art will be able to devise various arrangements that, although not explicitly described or shown herein, embody the principles of the disclosure and are included within its spirit and scope.

All examples and conditional language recited herein are intended for instructional purposes to aid the reader in understanding the principles of the disclosure and the concepts contributed by the inventor to furthering the art, and, are to be construed as being without limitation to such specifically recited examples and conditions.

Moreover, all statements herein reciting principles, aspects, and embodiments of the disclosure, as well as specific examples thereof, are intended to encompass both structural and functional equivalents thereof. Additionally, it is intended that such equivalents include both currently known equivalents as well as equivalents developed in the future, i.e., any elements developed that perform the same function, regardless of structure.

Thus, for example, it will be appreciated by those skilled in the art that the block diagrams presented herein represent conceptual views of illustrative circuitry embodying the principles of the disclosure. Similarly, it will be appreciated that any flow charts, flow diagrams, state transition diagrams, pseudocode, and the like represent various processes which may be substantially represented in computer readable media and so executed by a computer or processor, whether or not such computer or processor is explicitly shown.

The functions of the various elements shown in the figures may be provided through the use of dedicated hardware as well as hardware capable of executing software in association with appropriate software. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor ("DSP") hardware, read only memory ("ROM") for storing software, random access memory ("RAM"), and nonvolatile storage.

Other hardware, conventional and/or custom, may also be included. Similarly, any switches shown in the figures are conceptual only. Their function may be carried out through the operation of program logic, through dedicated logic, through the interaction of program control and dedicated logic, or even manually, the particular technique being selectable by the implementer as more specifically understood from the context.

In the claims hereof, any element expressed as a means for performing a specified finction is intended to encompass any way of performing that function including, for example, a) a combination of circuit elements that performs that function or b) software in any form, including, therefore, firmware, microcode or the like, combined with appropriate circuitry for executing that software to perform the function. The disclosure as defined by such claims resides in the fact that the functionalities provided by the various recited means are combined and brought together in the manner which the claims call for. It is thus regarded that any means that can provide those functionalities are equivalent to those shown herein.

In the following description, an example method according to an embodiment of the invention is described, as well as a device performing the methods. For purposes of explanation, various specific details are set forth in order to provide a thorough understanding of preferred embodiments. It will be evident, however, to one skilled in the art that the present disclosure may be practiced without these specific details.

A CPE device includes, but is not limited to, for example a controller, e.g. a microprocessor, a memory, in which an operating system is stored for the operation of the CPE device, a wireless node for a wireless communication, and a circuit for a broadband connection, e.g. an xDSL connection. The wireless node includes, but is not limited to, a software driver, a physical layer with data buffers, and an antenna. A CPE device of this kind is for example an access gateway.

The wireless node is controlled by the software driver which executes a number of background tasks during operation of the wireless node, e.g. dynamic rate adaptation, packet aggregation, channel quality monitoring, and the like. On top of signal manipulations, the wireless driver also embeds an IEEE 802.11 protocol stack with the associated IEEE defined management and control messaging. The wireless driver will hence inject a number of management and control packets in the data stream, making it difficult to analyze a link by transparently looking at the data frame exchange only.

FIG. 1 represents a system S comprising a plurality of wireless access points 1-10 located for example in a same building B. Most of those access points 1-10 are controlled by a same Internet Service Provider (ISP) and exchange data with at least one remote communication device 11 may belong to the Internet Service Provider, or may be managed by a third party, and executed the method according to an embodiment of the invention. The access points 1-10 may be regrouped in a plurality of sets of neighboring access points SET1, SET2, SET3. How these sets of access points SET1, SET2, SET3 are obtained will be explained with more details in reference to FIG. 4. The first set of neighboring access points SET1 comprises access point 1, and access points 8-10. The second set of neighboring access points SET2 comprises access point 2, and access points 5-6. The third set of neighboring access points SET3 comprises access point 7, and access points 3-4.

Figure 2:
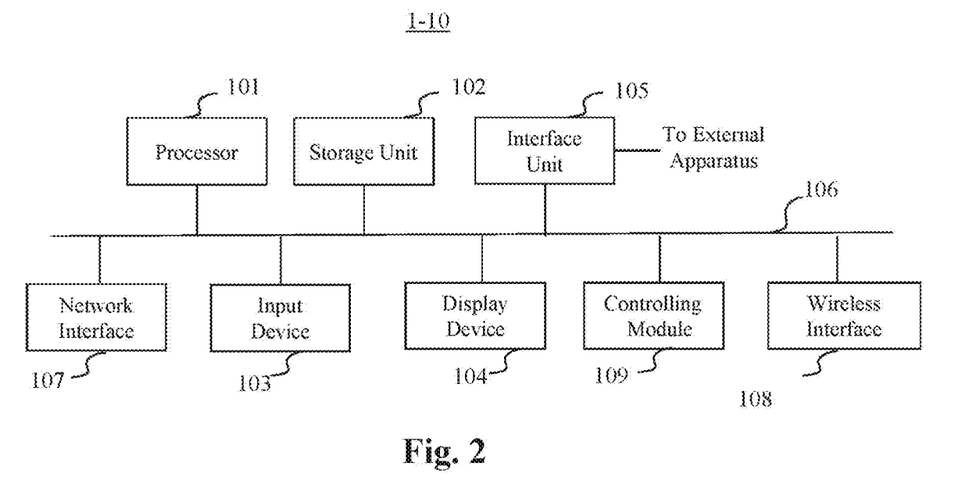
FIG. 2 represents a more detailed view of one of the access points according to an embodiment of the invention.

FIG. 2 represents a more detailed view of one of the access points 1-10 according to an embodiment of the invention.

An access point 1-10 may comprise at least one hardware processor 101, a storage unit 102, an input device 103, a display device 104, an interface unit 105, a network interface 107, at least one wireless interface 108 and a controlling module 109 which are connected by a bus 106. Of course, constituent elements of the access point 1-10 may be connected by a connection other than a bus connection.

The processor 101 controls operations of the access point 1-10. The storage unit 102 stores at least one program capable of monitoring and managing wireless communications to and from the access point 1-10, to be executed by the processor 101, and various data, such as parameters used by computations performed by the processor 101, intermediate data of computations performed by the processor 101, and so on. The processor 101 may be formed by any known and suitable hardware, or software, or a combination of hardware and software. For example, the processor 101 may be formed by dedicated hardware such as a processing circuit, or by a programmable processing unit such as a CPU (Central Processing Unit) that executes a program stored in a memory thereof.

The storage unit 102 may be formed by any suitable storage or means capable of storing the program, data, or the like in a computer-readable manner. Examples of the storage unit 102 include non-transitory computer-readable storage media such as semiconductor memory devices, and magnetic, optical, or magneto-optical recording media loaded into a read and write unit. The program causes the processor 101 to perform a process according to an embodiment of the present disclosure as described hereinafter with reference to FIG. 4.

The input device 103 may be formed by a keyboard, a pointing device such as a mouse, or the like for use by the user to input commands, to make user's selections of parameters used for selecting the transmission interface to be used. The display device 104 may be formed by a display device to display, for example, a Graphical User Interface (GUI). The input device 103 and the output device 204 may be formed integrally by a touchscreen panel, for example.

The interface unit 105 provides an interface between the access point 1-10 and an external apparatus. The interface unit 105 may be communicable with the external apparatus via cable or wireless communication. Such an external apparatus is for example a Set Top Box.

A network interface 107 provides a connection between the access point 1-10 and the communication device 11 via a backbone network (not shown in the figures), such as the Internet. The network interface 107 may provide, depending on its nature, a wired or a wireless connection to the backbone network.

A wireless interface 108 provides a wireless connection, for example a Wi-Fi connection, between the access point 1-10 and at least one station, e.g. a mobile phone (not shown on the figures).

A monitoring module 109 analyzes and evaluates the wireless connection established between the access point 1-10 and a station or another access point 1-10. The information gathered by the monitoring module 109 may include data rate, physical layer data rate, the amount of spatial streams used, channel bandwidth, medium availability and Received Signal Strength Indicator (RSSI) from associated stations as well as from neighboring access points, etc.

Figure 3:
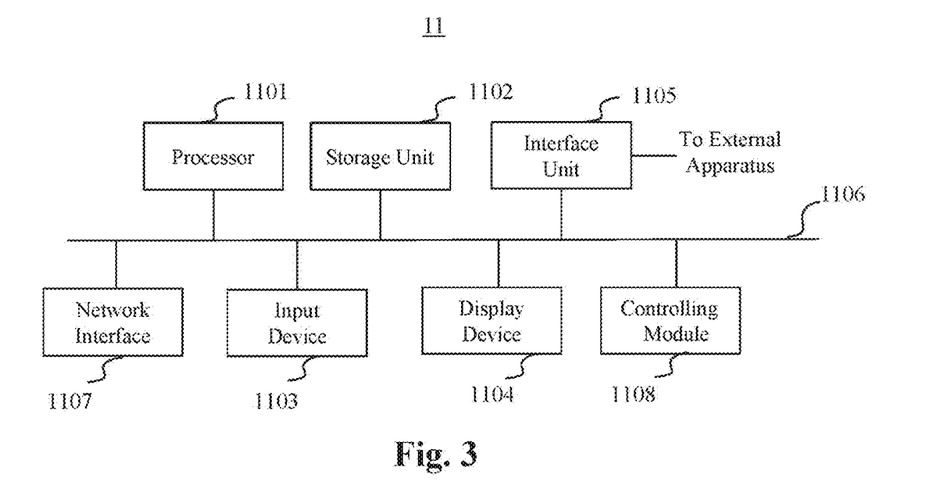
FIG. 3 is a schematic block diagram illustrating an example of a communication device according to an embodiment of the invention.

FIG. 3 is a schematic block diagram illustrating an example of a communication device 11 according to an embodiment of the invention.

The communication device 11 comprises at least one hardware processor 1101, a storage unit 1102, an input device 1103, a display device 1104, an interface unit 1105 and a network interface 1107 and a controlling module 1108 which are connected by a bus 1106. Of course, constituent elements of the communication device 11 may be connected by a connection other than a bus connection.

The processor 1101 controls operations of the communication device 11. The storage unit 1102 stores at least one program capable of being executed by the processor 1101, and various data, such as parameters used by computations performed by the processor 1101, intermediate data of computations performed by the processor 1101, and so on. The processor 1101 may be formed by any known and suitable hardware, or software, or a combination of hardware and software. For example, the processor 1101 may be formed by dedicated hardware such as a processing circuit, or by a programmable processing unit such as a CPU (Central/Processing Unit) that executes a program stored in a memory thereof.

The storage unit 1102 may be formed by any suitable storage or means capable of storing the program, data, or the like in a computer-readable manner. Examples of the storage unit 1102 include non-transitory computer-readable storage media such as semiconductor memory devices, and magnetic, optical, or magneto-optical recording media loaded into a read and write unit. The program causes the processor 1101 to perform a process according to an embodiment of the present disclosure as described hereinafter with reference to FIG. 4.

The input device 1103 may be formed by a keyboard, a pointing device such as a mouse, or the like for use by the user to input commands, to make user's selections of parameters used for selecting the transmission interface to be used. The display device 1104 may be formed by a display device to display, for example, a Graphical User Interface (GUI). The input device 1103 and the output device 1104 may be formed integrally by a touchscreen panel, for example.

The interface unit 1105 provides an interface between the communication device 11 and an external apparatus. The interface unit 1105 may be communicable with the external apparatus via cable or wireless communication.

The network interface 1107 provides a connection between the communication device 11 and the access points 1-10 through a backbone network (not shown in the figures), such as the Internet. The network interface 1107 may provide, depending on its nature, a wired or a wireless connection to the backbone network.

The controlling module 109 analyzes and evaluates the wireless connection established between the access points 1-10 and their respective stations. The information gathered by the controlling module 109 may include achievable data rate, physical layer data rate, multiple spatial streams, channel bandwidth, medium availability and Received Signal Strength Indicator (RSSI), etc.

Figure 4:
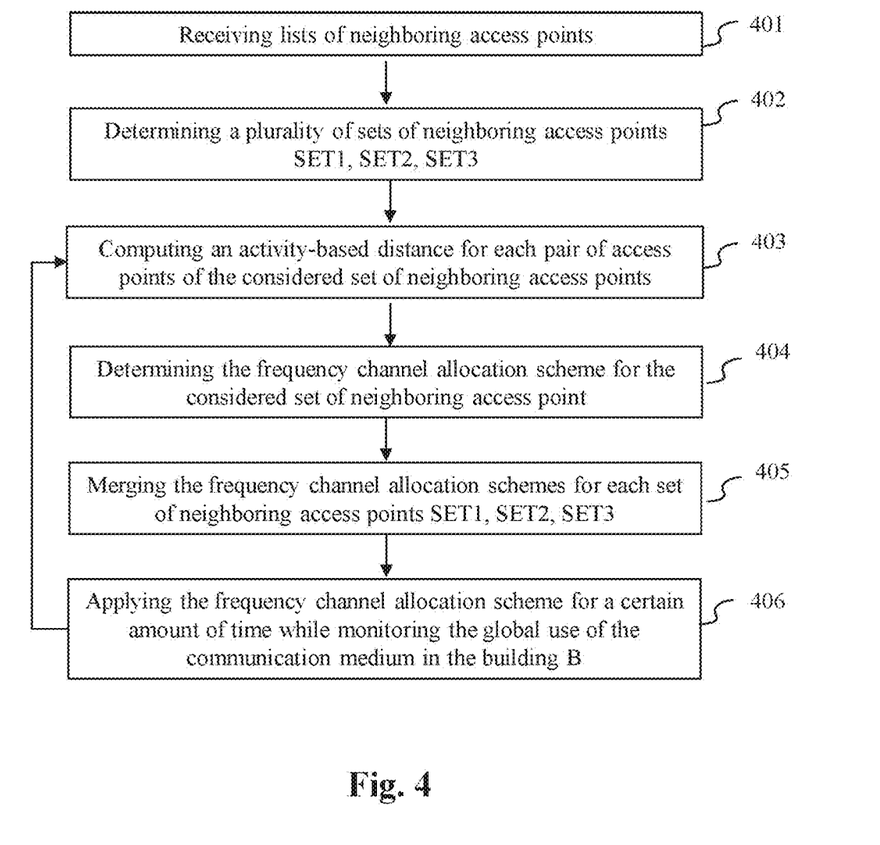
FIG. 4 is a flow chart for explaining a process for allocating a frequency channel to an access point according to an embodiment of the invention.

FIG. 4 is a flow chart for explaining a process for allocating a frequency channel to an access point 1-10 according to an embodiment of the invention.

In a step 401 the communication device 11 receives through the network interface 1107 and for each access point 1-10, a list of the neighboring access points, also called a scanlist. Such a list comprises an identifier of the access points 1-10 from which a given access point can receive beacon messages together with their RSSI.

Based on those scanlists, the processor 1101 determines a plurality of sets of neighboring access points SET1, SET2, SET3 during step 402. This can be done, for example, using a Label Propagation Algorithm which advantage is its linear runtime complexity. Such an algorithm assigns a unique label to every access points 1-10 in the building B. These labels propagate within the network of access points 1-10. Labels are then reassigned between the access point 1-10 depending on their frequency of occurrence amongst the access points neighboring a given access point.

In another embodiment of the invention, the Girvan-Newman algorithm may be used. This algorithm iteratively removes the pairs of access points with the highest betweenness centrality from the network, the betweenness centrality of a pair of access points e is defined by:

$$g(e) = \sum_{s,t \in V} \frac{\sigma_{st}(e)}{\sigma_{st}}$$

where $\sigma_{st}$ is the total count of shortest paths from an arbitrary access point s to any other arbitrary access point t and $\sigma_{st}(e)$ is the amount of shorted paths that passes through the pair of access points e.

Steps 401 and 402 are optional. These two steps are executed when there is a great number of access points located in the same building B in order to break down the allocation of frequency channels between all the access points 1-10 of the building B into an allocation of frequency channels per set of neighboring access points SET1, SET2, SET3. Allocating frequency channels per set of neighboring access points SET1, SET2, SET3, makes it possible to incorporate the most probable access nodes to behave as a hidden node for each other into a set of neighboring access points.

For each set of neighboring access points SET1, SET2, SET3 a frequency channel allocation scheme is computed by the processor 1101 of the communication device 11. The following steps of the method according to an embodiment of the invention are described for the set of neighboring access points SET1. However, those steps are executed for each set of neighboring access points SET2, SET3 determined during steps 401, 402.

In a step 403, the processor 1101 computes an activity-based distance for each pair of access points of the considered set of neighboring access points.

Define V as a set of access points $v_i$ for which frequency channels are to be allocated. Here V corresponds to the set of neighboring access points SET1 and the access points $v_i$ corresponds to access points 1 and 8-10.

Define K as a set of non-overlapping frequency channels to allocate. Assume |V|=n access points and |K|=m frequency channels.

A distance matrix D is given as follow: $D=(d_{ij}) \in \mathbb{R}^{n \times n}$ where $d_{ij}=dst(v_i,v_j)$, $\forall v_i, v_j \in V$ and dst: $V \times V \to \mathbb{R}^+$.

A frequency channel allocation matrix C is given as follow: $C=(c_{ik}) \in \mathbb{R}^{n \times m}$ where $$c_{ik} = \begin{cases} 1 & \text{if access point } i \text{ is assigned frequency channel } k \\ 0 & \text{if access point } i \text{ is not assigned frequency channel } k \end{cases}$$

In order to compute the activity-based distance, a usage of the communication medium, i.e. the m frequency channels are monitored by the communication device 11. The different access points forward information collected by their controlling module 109 to the controlling module 1108 of the communication device 11 which processes them. For example, the usage of the communication module is monitored for a week and is then discretized into slots of fifteen minutes, which gives 672 slots: $\forall v \in V: u_v \in \mathbb{R}^{672}$.

Then a dynamic time warping algorithm is used to compute a distance between two temporal sequences representing the usage of the communication medium by two access points as follow:

$$cdtw(u_i,u_j): \mathbb{R}^n \times \mathbb{R}^n \to \mathbb{R}^+$$

$$dst(i,j)=cdtw(u_i,u_j)$$

The goal behind this approach is to minimize a time overlap in the use of the communication medium by access points, for example, an access point using the communication medium during evening hours may share the communication medium, i.e. the same frequency channel, with an access point using the communication medium during office hours because the time overlap in the use of the communication medium is small.

In an embodiment of the invention, it is possible to take into account a history of the use of the communication medium as follow:

$$u_{i+1}=\alpha u_i+(1-\alpha)u_{new}$$

where $u_i$ is the use pattern of the communication medium up to the previous week, $u_{new}$ is the use pattern of the communication medium of the previous week, $u_{i+1}$ is an updated pattern and, $0 \leq \alpha \leq 1$ is the learning rate indicating whether there should be an emphasis on either new or historical data.

Once the activity-based distance has been computed, the processor 1101 determines the frequency channel allocation scheme for the considered set of neighboring access point SET1 during step 404.

Allocating frequency channels consists in reducing the following function:

$$F(D, C) = \sum_{k \in K} \sum_{i \in V} \sum_{j \in V} \frac{1}{1+D_{ij}} C_{ik} C_{jk}$$

which may be subject, in an embodiment of the invention to:

$$\Sigma_{k \in K} C_{ik}=1, \forall i \in V.$$

For example, allocating a same frequency channel to two neighboring access nodes with the largest activity-based distance since these two access nodes would be less likely to interfere with each other than access points with a smaller distance.

This constraint is introduced to ensure that every access point in the set of neighboring access point gets allocated one frequency channel.

In a step 405, the processor 1101 merges the frequency channel allocation schemes obtained during steps 403 to 404 for each set of neighboring access points SET1, SET2, SET3, thus obtaining a global frequency channel allocation scheme for the whole building B.

In an optional step 406, the communication device 11 applies the frequency channel allocation scheme for a certain amount of time while monitoring through its controlling module 1108 the global use of the communication medium in the building B. This monitoring enables to detect the situations where access points belonging to two different sets of neighboring access points SET2 and SET3, for example, use the same frequency channel at the same time and are in conditions that are such as to cause interference to each other. This information is then taken into account as a constraint in a new iteration of steps 403 to 406.

Steps 403 to 406 are executed until there are no more access points causing interference to each other in the whole building B.

Although the present invention has been described hereinabove with reference to specific embodiments, the present invention is not limited to the specific embodiments, and modifications will be apparent to a skilled person in the art which lie within the scope of the present invention.

Many further modifications and variations will suggest themselves to those versed in the art upon referring to the foregoing illustrative embodiments, which are given by way of example only and which are not intended to limit the scope of the invention, that being determined solely by the appended claims. In particular, the different features from different embodiments may be interchanged, where appropriate.

The invention claimed is:

1. A method for allocating frequency channels, the method comprising:
receiving wireless medium usage information from a plurality access points (APs), wherein the wireless medium information includes usage of the wireless medium over multiple periods of time for each AP of the plurality of APs;
computing an activity-based parameter between each AP of the plurality of APs based on the wireless medium usage information, wherein the activity based-parameter is indicative of a similarity between a plurality of use patterns of the wireless medium over multiple periods of time, and wherein each use pattern of the wireless medium is determined for one period of time of the multiple periods of time, wherein each use pattern is weighted according to how recent the wireless medium usage information is for a given period of time, wherein the similarity between the plurality of use patterns is calculated using a dynamic time warping algorithm; and
minimizing time overlap of the usage of the wireless medium by the plurality of APs by allocating a frequency channel to each AP of the plurality of APs based on the computed activity-based parameter.

2. The method according to claim 1, wherein the computing the activity-based parameter further includes assigning a weight to one or more time periods of the multiple time periods.

3. The method according to claim 2, wherein the one or more weighted time periods is a most recent time period of the multiple time periods.

4. The method according to claim 2, wherein the one or more weighted time periods is not a most recent time period of the multiple time periods.

5. The method according to claim 1, wherein allocating the frequency channel further includes minimizing a function based on a current frequency channel allocation, a set of available frequency channels, and the computed activity-based parameter.

6. The method according to claim 1, further comprising grouping the plurality of APs into a plurality of sets of APs based on beacon messages that identify neighboring APs.

7. The method according to claim 6, further comprising monitoring the plurality of APs after the allocation to determine if there is a conflict in an allocation of a frequency channel between the plurality of sets of APs.

8. A device for allocating frequency channels, the device comprising a processor and a receiver configured to carry out computer program instructions stored in memory, the computer program instructions comprising:
receiving wireless medium usage information from a plurality access points (APs), wherein the wireless medium information includes usage of the wireless medium over multiple periods of time for each AP of the plurality of APs;
computing an activity-based parameter between each AP of the plurality of APs based on the wireless medium usage information, wherein the activity based-parameter is indicative of a similarity between a plurality of use patterns of the wireless medium over multiple periods of time, and wherein each use pattern of the wireless medium is determined for one period of time of the multiple periods of time, wherein each use pattern is weighted according to how recent the wireless medium usage information is for a given period of time, wherein the similarity between the plurality of use patterns is calculated using a dynamic time warping algorithm; and
minimizing time overlap of the usage of the wireless medium by the plurality of APs by allocating a frequency channel to each AP of the plurality of APs based on the computed activity-based parameter.

9. The device according to claim 8, wherein the computing the activity-based parameter further includes assigning a weight to one or more time periods of the multiple time periods.

10. The device according to claim 9, wherein the one or more weighted time periods is a most recent time period of the multiple time periods.

11. The device according to claim 9, wherein the one or more weighted time periods is not a most recent time period of the multiple time periods.

12. The device according to claim 8, wherein allocating the frequency channel further includes minimizing a function based on a current frequency channel allocation, a set of available frequency channels, and the computed activity-based parameter.

13. The device according to claim 8, further comprising grouping the plurality of APs into a plurality of sets of APs based on beacon messages that identify neighboring APs.

14. The device according to claim 13, further comprising monitoring the plurality of APs after the allocation to determine if there is a conflict in an allocation of a frequency channel between the plurality of sets of APs.

* * * * *